(12) United States Patent
Faulkner et al.

(10) Patent No.: US 11,684,016 B2
(45) Date of Patent: Jun. 27, 2023

(54) CHOPPER WITH MOVABLE OUTLET FLOOR RAMP

(71) Applicant: DEERE & COMPANY, Moline, IL (US)

(72) Inventors: Christopher J. Faulkner, Eldridge, IA (US); Martin Rittershofer, East Moline, IL (US); Dirk Schubert, Rehweiler (DE); Martin Stock, Zweibruecken (DE)

(73) Assignee: Deere & Company, Moline, IL (US)

( * ) Notice: Subject to any disclaimer, the term of this patent is extended or adjusted under 35 U.S.C. 154(b) by 349 days.

(21) Appl. No.: 17/083,427

(22) Filed: Oct. 29, 2020

(65) Prior Publication Data

US 2022/0132742 A1    May 5, 2022

(51) Int. Cl.
*A01F 29/09* (2010.01)
*A01F 29/04* (2006.01)
*A01D 41/12* (2006.01)

(52) U.S. Cl.
CPC ........ *A01F 29/095* (2013.01); *A01D 41/1243* (2013.01); *A01F 29/04* (2013.01)

(58) Field of Classification Search
CPC ........ A01F 29/095; A01F 29/04; A01F 12/40; A01D 41/1243
See application file for complete search history.

(56) References Cited

U.S. PATENT DOCUMENTS

| 2,626,159 | A | * | 1/1953 | Thompson | A01F 12/40 460/109 |
| 5,503,339 | A | * | 4/1996 | Doppstadt | B02C 13/04 241/189.1 |
| 6,152,820 | A | * | 11/2000 | Heidjann | A01F 12/40 460/80 |
| 10,010,028 | B1 | * | 7/2018 | Dilts | A01F 12/40 |
| 10,531,611 | B2 | | 1/2020 | Larson et al. | |
| 2005/0282602 | A1 | * | 12/2005 | Redekop | A01F 12/40 460/112 |
| 2006/0073860 | A1 | * | 4/2006 | Redekop | A01D 41/1243 460/112 |

(Continued)

FOREIGN PATENT DOCUMENTS

| EP | 2837280 A1 | 2/2015 |
| EP | 2965615 A1 * | 1/2016 ......... A01D 41/1243 |

(Continued)

*Primary Examiner* — Arpad F Kovacs

(57) ABSTRACT

A chopper for an agricultural harvester comprises a housing, a rotor, a bank of counter-knives, and an adjuster. The housing comprises a variable geometry outlet floor. The is positioned in an interior region of the housing for rotation therein relative to the housing. The bank of counter-knives is movable relative to the rotor between a first aggressiveness position and a second aggressiveness position to adjust chopping aggressiveness of the chopper. The outlet floor comprises a ramp movable relative to the rotor between a first ramp position and a second ramp position. The adjuster positions the ramp in the first ramp position when the bank of counter-knives is positioned in the first aggressiveness position and positions the ramp in the second ramp position when the bank of counter-knives is positioned in the second aggressiveness position.

14 Claims, 6 Drawing Sheets

(56) References Cited

U.S. PATENT DOCUMENTS

| | | | |
|---|---|---|---|
| 2010/0291982 A1* | 11/2010 | Isaac | A01F 12/40 460/111 |
| 2015/0038201 A1* | 2/2015 | Brinkmann | A01F 29/00 460/112 |
| 2017/0055445 A1 | 3/2017 | Mahieu et al. | |
| 2017/0086379 A1 | 3/2017 | Weichholdt | |
| 2017/0099771 A1* | 4/2017 | Linde | A01D 41/1243 |
| 2021/0015039 A1 | 1/2021 | Vandike et al. | |
| 2021/0337730 A1* | 11/2021 | Rittershofer | A01F 12/40 |

FOREIGN PATENT DOCUMENTS

| | | | | |
|---|---|---|---|---|
| EP | 3138383 A1 | 3/2017 | | |
| EP | 3153010 A1 | 4/2017 | | |
| WO | WO-2014179563 A1 * | 11/2014 | | A01F 12/40 |

* cited by examiner

CHOPPER WITH MOVABLE OUTLET FLOOR RAMP

FIELD OF THE DISCLOSURE

The present disclosure relates to residue management systems for agricultural harvesters, in particular, to choppers for such residue management systems.

BACKGROUND OF THE DISCLOSURE

Agricultural harvesters harvest crop from a field and process the harvested crop to separate grain from crop residue. Agricultural harvesters commonly have a residue management system for returning crop residue to the field. Such residue management systems typically have a chopper that chops crop residue into smaller pieces. In some residue management system configurations, the chopper propels the chopped residue toward a residue spreader of the harvester which spreads the chopped residue onto the field.

SUMMARY OF THE DISCLOSURE

According to an aspect of the present disclosure, there is disclosed a chopper for an agricultural harvester. The chopper comprises a housing, a rotor, a bank of counter-knives, and adjuster. The housing comprises a variable geometry outlet floor. The rotor is positioned in an interior region of the housing for rotation therein relative to the housing and comprises blades that interact with the bank of counter-knives to chop crop residue upon rotation of the rotor in a chopping direction. The bank of counter-knives is movable relative to the rotor between a first aggressiveness position and a second aggressiveness position to adjust a chopping aggressiveness of the chopper with the chopping aggressiveness being greater when the bank of counter-knives is positioned in the first aggressiveness position than in the second aggressiveness position. The aggressiveness position of the bank of counter-knives can affect the trajectory of crop residue relative to a residue spreader of the agricultural harvester. The outlet floor comprises a ramp positioned downstream from the bank of counter-knives relative to the chopping direction. The ramp is movable relative to the rotor between a first ramp position and a second ramp position to manage the trajectory of crop residue relative to the residue spreader. The ramp is raised more into the interior region in the second ramp position than in the first ramp position. The adjuster is in communication with the bank of counter-knives and the ramp to position the ramp in the first ramp position when the bank of counter-knives is positioned in the first aggressiveness position and to position the ramp in the second ramp position when the bank of counter-knives is positioned in the second aggressiveness position.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
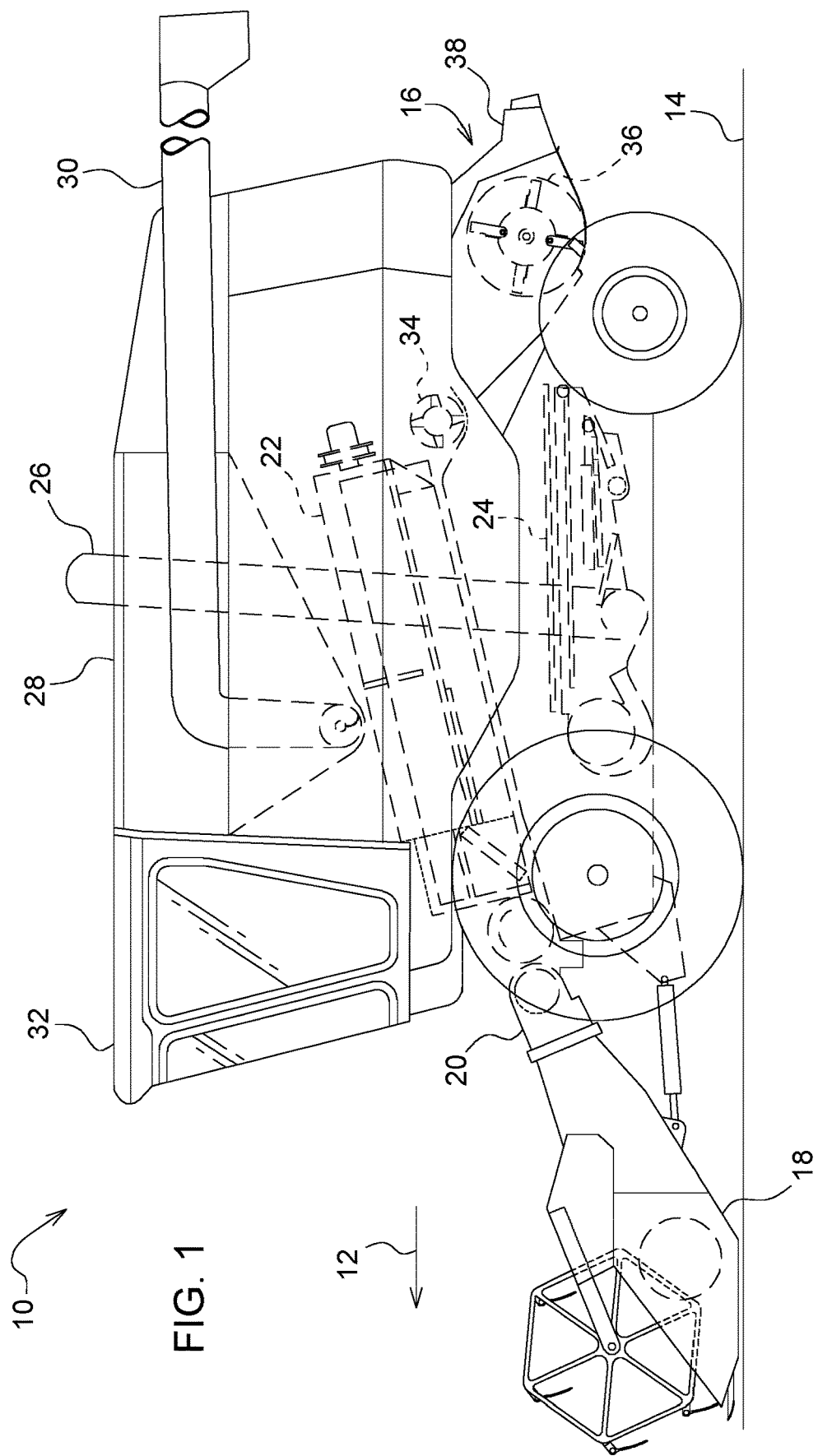
FIG. 1 is a side elevational view showing an agricultural harvester with a residue management system mounted at the rear of the agricultural harvester.

Referring to FIG. 1, an agricultural harvester 10 is configured to move in a forward direction of travel 12 over a field 14 to harvest crop from the field 14. The harvester 10 processes the crop, separating grain from crop residue (e.g., straw, stalks, cobs, leaves, chaff). The harvester 10 includes a residue management system 16 for returning crop residue, derived from harvested crop, back to the field 14.

In general, the harvester 10 can include an implement 18 to cut, gather, and transport crop rearwardly, a feederhouse 20 to advance crop received from the implement into the body of the harvester 10, a threshing and separating section 22 to thresh crop and further separate grain from crop residue, a cleaning section 24 including one more chaffers and sieves to separate grain from chaff or other relatively small pieces of crop material, a clean grain elevator 26 to elevate clean grain to a storage bin 28, an unloader 30 to unload clean grain from the storage bin 28 to another location, and a beater 34 to beat residue that is received from the threshing and separating section 22 and does not pass to the cleaning section 24 (e.g., straw, stalks, cobs, leaves). A person can control the harvester 10 from an operator's station 32 of the harvester 10. The harvester 10, including such portions thereof, can be configured in a wide variety of ways.

Figure 2:
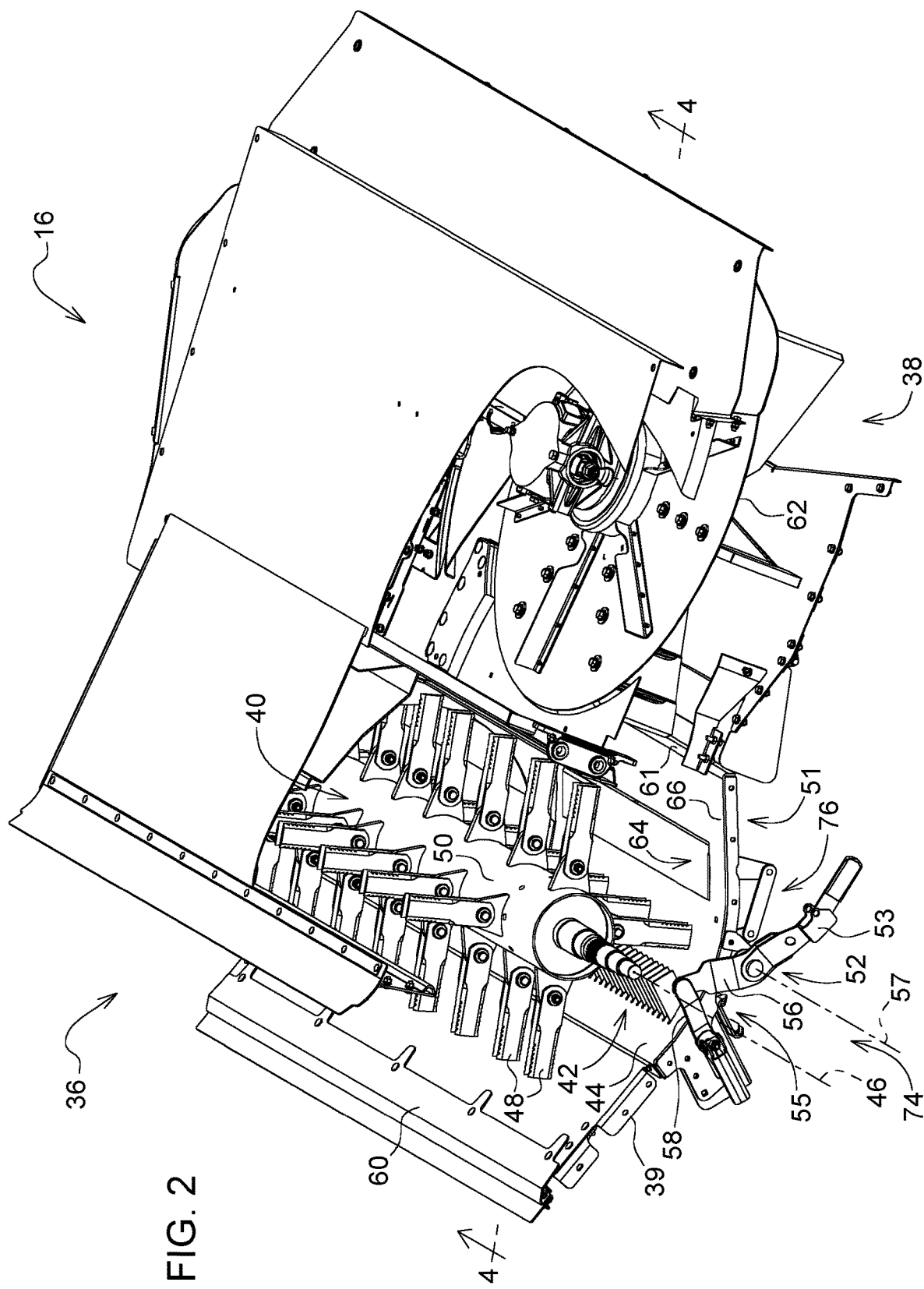
FIG. 2 is a perspective view showing the residue management system with a chopper and a residue spreader.
Figure 3:
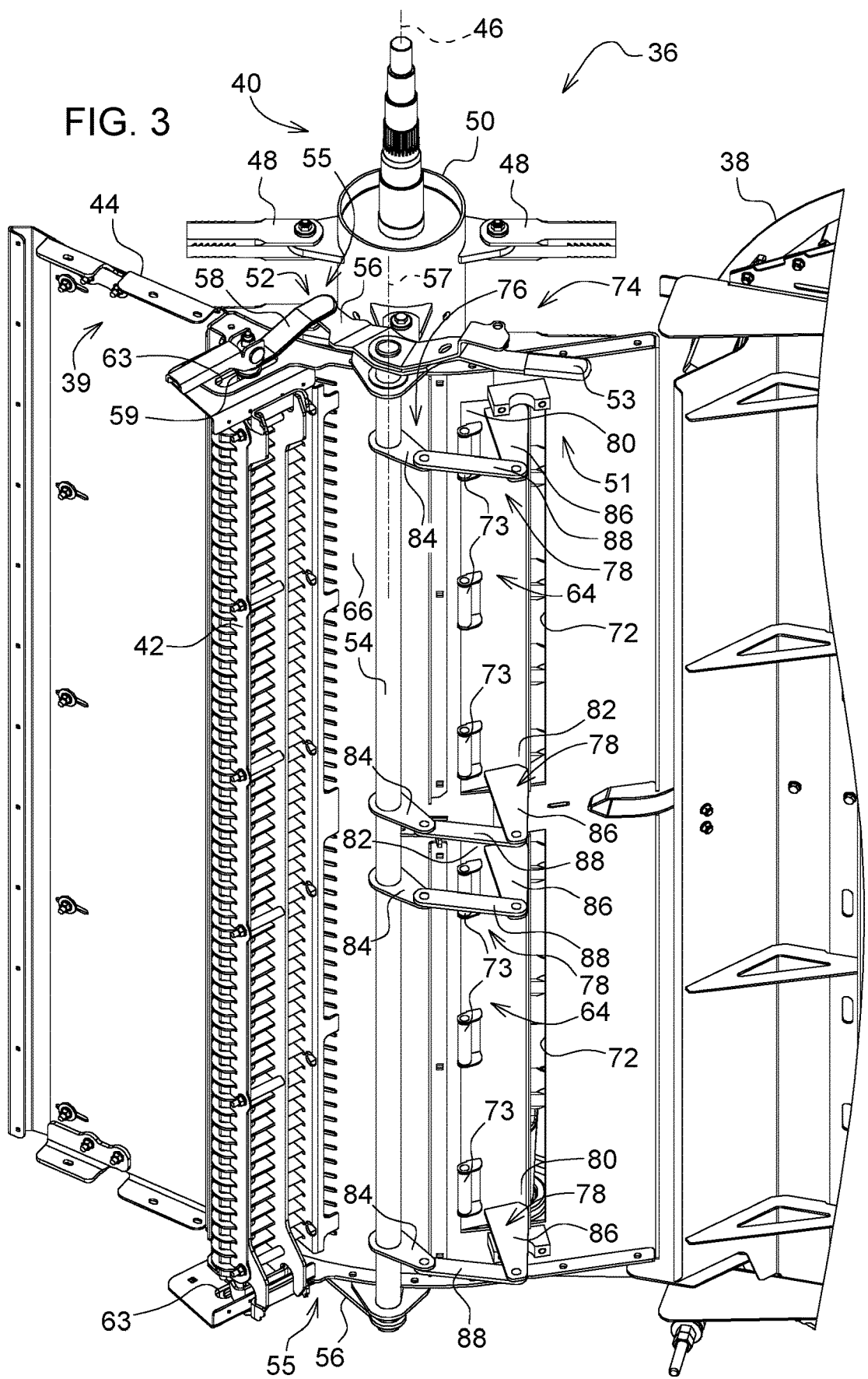
FIG. 3 is a bottom perspective view showing an adjuster for changing the position of a bank of counter-knives of the chopper and the position of a ramp of the chopper in correspondence with the position of the bank of counter-knives.
Figure 4:
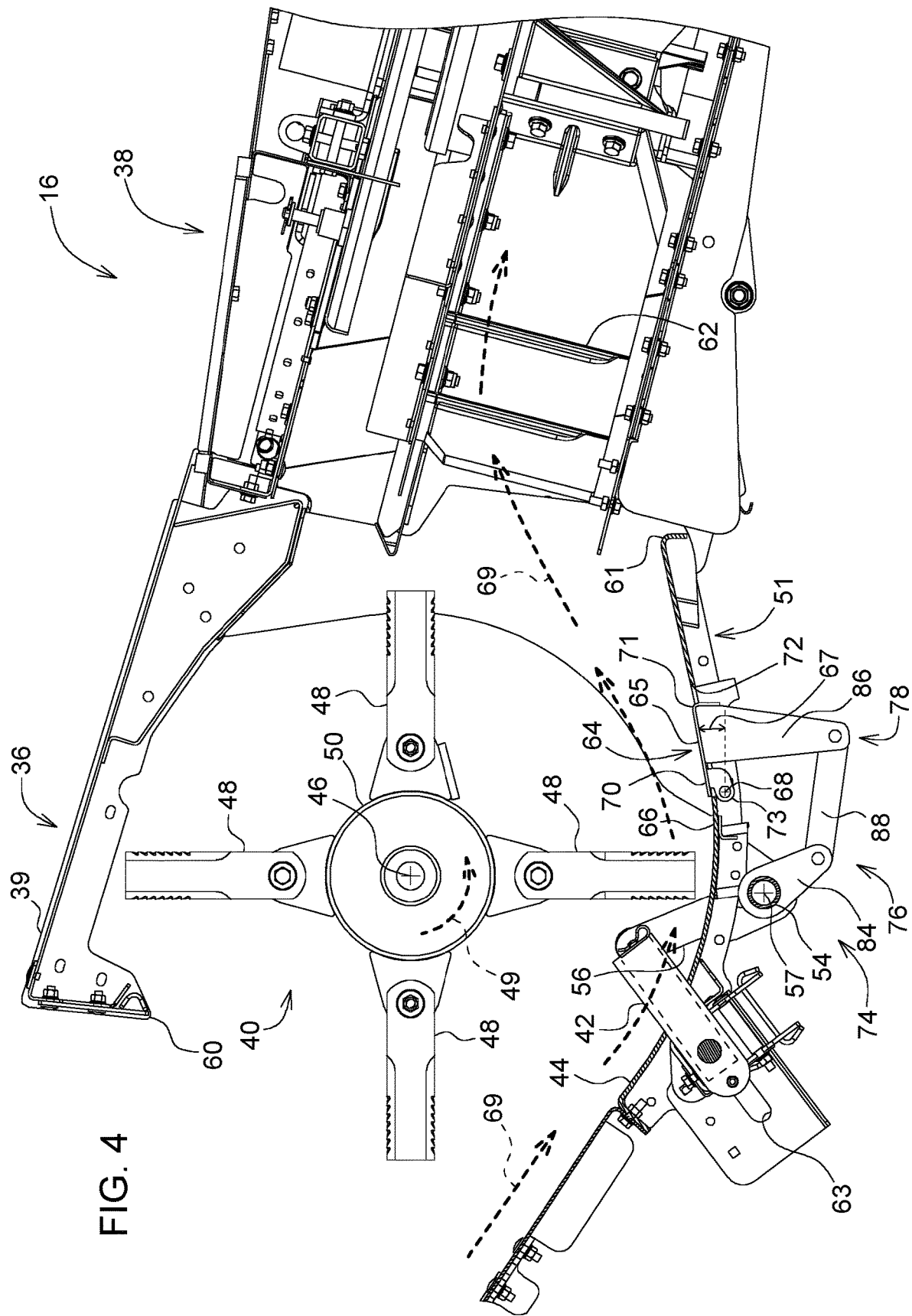
FIG. 4 is a side elevational view showing the bank of counter-knives in a first aggressiveness position and the ramp in a first ramp position.

Referring to FIG. 2, the residue management system 16 includes a chopper 36 and a residue spreader 38. The chopper 36 chops crop residue derived from crop harvested from the field 14 by the harvester 10. The residue spreader 38 is positioned rearward of the chopper 36. In some examples, the residue spreader 38 can be mounted for pivotable movement relative to the chopper 36 between a dispersal position to disperse crop residue received from the chopper 36 onto the field 14 and a windrow position to deposit crop residue received over the residue spreader from the harvester onto the field 14 in a windrow. In other examples, the residue spreader 38 can be mounted in a fixed position relative to the chopper 36.

The chopper 36 can receive crop residue from the threshing and separating section 22 and the cleaning section 24. In some examples, the harvester 10 includes a door that is closed to direct crop residue from the threshing and separating section 22 and the beater 34 to the chopper 36 for chopping when the residue spreader 38 is positioned in the dispersal position. When the residue spreader 38 is positioned in the windrow position, the door is closed to direct crop residue from the threshing and separating section 22 and the beater 34 over the top of the residue spreader 38 to deposit crop residue onto the field 14 in a windrow. In some examples, the chopper 36 can receive crop residue in the form of, for example, chaff from the cleaning section 24 in one or both of the dispersal position and the windrow position.

Referring to FIGS. 3-6, the chopper 36 includes a housing 39, a rotor 40, and a bank of counter-knives 42. The rotor 40 is mounted to the housing 39 and positioned in an interior region 44 of the housing 39 for rotation therein about an axis of rotation 46 relative to the housing 39. The rotor 40 includes blades 48 that interact with the bank of counter-knives 42 to chop crop residue upon rotation of the rotor 40 about the axis of rotation 46 in a chopping direction 49. The blades 48 are mounted about the periphery of a hub 50 of the rotor 40. In the illustrated example, the rotor is a flail rotor, such that the blades 48 are flail blades.

The bank of counter-knives 42 is movable relative to the rotor 40 to adjust a chopping aggressiveness of the chopper 36. The bank of counter-knives 42 is movable relative to the rotor 40 and the axis of rotation 46 between at least two aggressiveness positions, including, for example, a first aggressiveness position (FIG. 4) and a second aggressiveness position (FIG. 5), to adjust the chopping aggressiveness of the chopper 36, with the chopping aggressiveness being greater when the bank of counter-knives 42 is positioned in the first aggressiveness position than in the second aggressiveness position. The aggressiveness position of the bank of counter-knives 42 can be described in terms of engagement, such as between 0% engagement and 100% engagement, with the first aggressiveness position being at a higher percentage of engagement than the second aggressiveness position. As such, each aggressiveness position may be referred to as an engagement position.

In the illustrated example, the counter-knives 42 can extend through corresponding slits in an outlet floor 51 of the housing 39 to extend alternatingly between the blades 48 to promote chopping of crop residue that enters the interior region 44. Greater extension from the outlet floor 51 into the interior region 44 corresponding to more engagement and thus more chopping aggressiveness. The bank of counter-knives 42 move in a linear manner toward and away from the rotor 40 and its axis of rotation 46 between aggressiveness positions. In other examples, the bank of counter-knives 42 could be configured to move in other between aggressiveness positions ways (e.g., pivotally).

The chopper 36 includes a knife actuator 52 to adjust the aggressiveness position of the bank of counter-knives 42. The knife actuator 52 is operable to move the bank of counter-knives 42 between the first and second aggressiveness positions. The knife actuator 52 can be configured in a conventional manner or any suitable manner for adjusting the aggressiveness position of the bank of counter-knives 42.

In the illustrated example, the knife actuator 52 is manually operable to move the bank of counter-knives 42 linearly between aggressiveness positions. In that example, the knife actuator 52 includes a handle 53, a rotatable shaft 54, and a linkage 55. The shaft 54 is rotatably mounted to the housing 39. The handle 53 and a first link 56 of the linkage 55 are fixed to the shaft 54 to rotate therewith about an axis of rotation 57 of the shaft 54. The linkage 55 includes a second link 58 pivotally coupled to the first link 56 and a sliding element 59, which is coupled to the bank of counter-knives 42 and positioned in a slot 63 of the housing 39 for linear movement therein. The knife actuator 52 also includes another linkage 55 and sliding element 59 similarly configured and arranged at the opposite end of the bank of counter-knives 42. To change the aggressiveness position of the bank of counter-knives 42, a person can move the handle 53 causing the shaft 54 to rotate about the axis 57 and the linkages 54, acting through the sliding elements 59 in the corresponding slots 63, to move the bank of counter-knives 42 linearly between aggressiveness positions. In other examples, the knife actuator 52 can be configured to be actuated electronically or otherwise to adjust the aggressiveness position of the bank of counter-knives 42.

The housing 39 includes a residue inlet 60 and a residue outlet 61. Crop residue from the threshing and separating section 22 and beater 34 can enter the chopper 36 through the residue inlet 60 into interior region 44. Crop residue can exit the chopper 36 from the interior region 44 through the residue outlet 61 to the residue spreader 38.

In some examples, the residue spreader 38 includes a right spreading device 62 and a left spreading device 62 laterally adjacent to the right spreading device 62 (only right spreading device 62 shown). Each spreading device 62 is configured to disperse crop residue onto the field 14 when the residue spreader 38 is positioned in the dispersal position. The spreading device 62 can be configured and operated in a wide variety of ways. For example, illustratively, the spreading device 62 includes an impeller with a rotating disk and paddles depending therefrom for dispersing crop residue from the residue spreader 38.

The aggressiveness position of the bank of counter-knives 42 can affect the trajectory of crop residue through the residue outlet 61 relative to the residue spreader 38 (the trajectory is shown generally at 69). The chopper 36 tends to direct crop residue more at the residue spreader 36 and its spreading devices 62 with increased chopping aggressiveness of the bank of counter-knives 42 (increased engagement). In the absence of the ramp 64 discussed herein, the chopper 36 may tend to undershoot (deliver crop residue low to) the residue spreader 36 and its spreading devices 62 with decreasing chopping aggressiveness of the bank of counter-knives 42 (decreasing engagement), resulting in lower residue-spreading effectiveness of the residue spreader 38. More particularly, the chopper 36 may tend to undershoot the residue spreader 36 when the bank of counter-knives 42 is at 0-50% engagement, with less uniform spread distribution compared to greater than 50% engagement.

The outlet floor 51 of the chopper 36 has a variable geometry to manage the trajectory of crop residue relative to the residue spreader 38. The outlet floor 51 includes one or more ramps 64, for example, two ramps 64. The ramps 64 are longitudinally aligned relative to one another, so as to collectively substantially span a width of the interior region 44.

Figure 5:
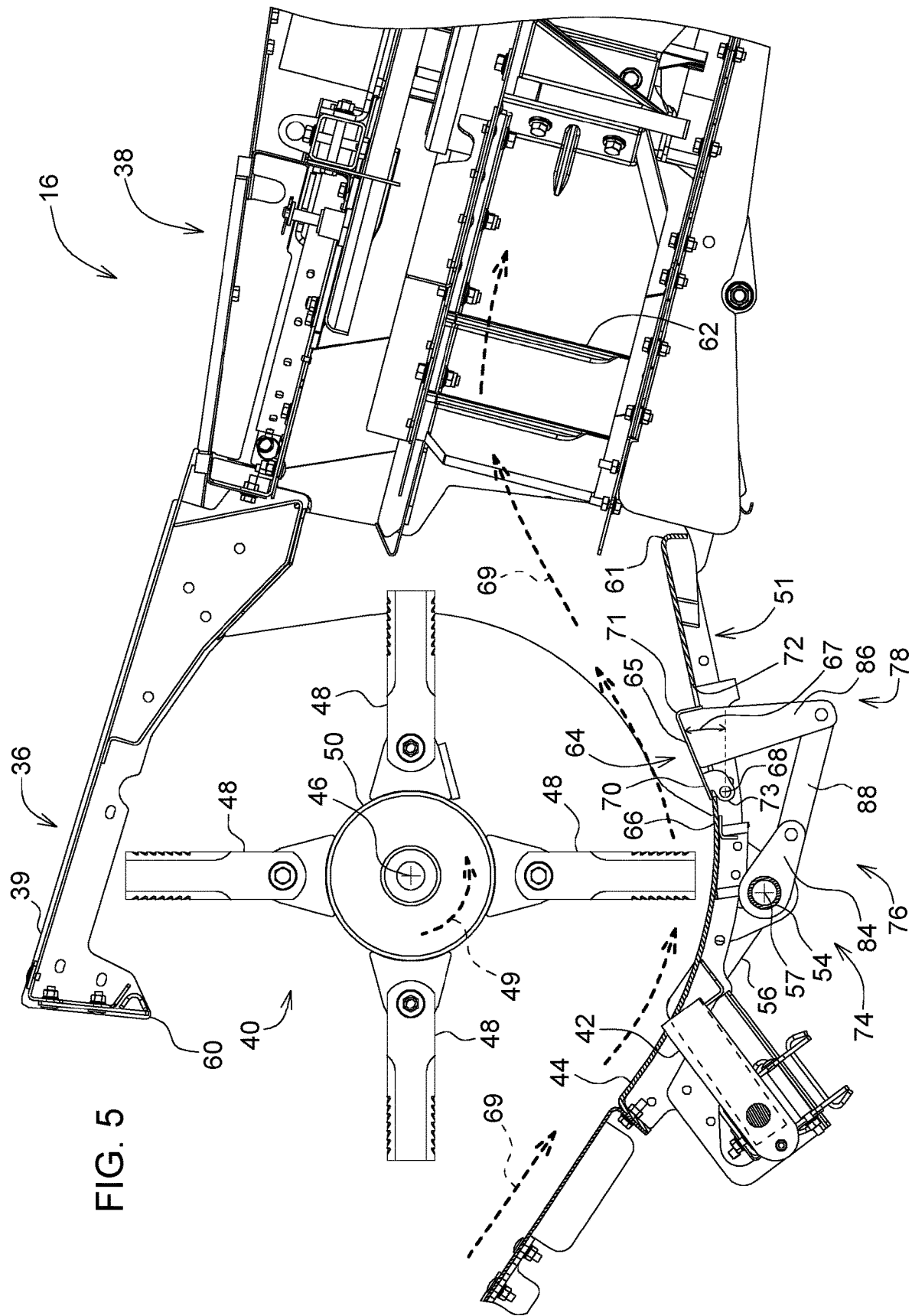
FIG. 5 is a side elevational view showing the bank of counter-knives in a second aggressiveness position and the ramp in a second ramp position.

Each ramp 64 is positioned downstream from the bank of counter-knives 42 relative to the chopping direction 49. The ramp 64 is movable relative to the rotor 40 and the axis of rotation 46 between a number of ramp positions to manage the trajectory of crop residue relative to the residue spreader 38. The ramp positions include, for example, a first ramp position (FIG. 4) and a second ramp position (FIG. 5). The ramp 64 is raised more into the interior region 44 toward the axis of rotation 46 in the second ramp position than in the first ramp position. The ramp 64 has a greater angle of inclination 67 in the second ramp position than in the first ramp position. In the second ramp position, the ramp 64 presents a slope 65 to oncoming crop residue to manage the trajectory of such crop residue. In the second ramp position, the ramp 64 lifts the crop material so as to direct crop residue through the residue outlet 61 to the residue spreader 38, in a manner similar to 100% engagement of the bank of counter-knives 42, resulting in acceptable spread performance.

In the illustrated example, the ramp 64 is mounted for pivotable movement between the first ramp position and the second ramp position. The ramp 64 is coupled to a fixed portion 66 of the outlet floor 51 for pivotable movement about a ramp pivot axis 68 between the first ramp position and the second ramp position. The ramp 64 includes a first end portion 70 coupled pivotally to the fixed portion 66 of the outlet floor 51 and a second end portion 72 movable about the ramp pivot axis 68 between the first ramp position and the second ramp position. The ramp 64 is positioned in and extends through an opening 72 of the outlet floor 51. Illustratively, the first end portion 70 is coupled pivotally to the fixed portion 66 via one or more hinges 73 (e.g., three hinges 73). The first end portion 70 is positioned between the bank of counter-knives 42 and the second end portion 72. As such, the first end portion 70 is positioned upstream from the second end portion 72 relative to the chopping direction 49.

The chopper 36 includes an adjuster 74. The adjuster 74 is in communication with the bank of counter-knives 42 and the ramp 64 to position the ramp 64 in correspondence with the aggressiveness position of the bank of counter-knives 42. The adjuster 74 positions the ramp 64 in the first ramp position when the bank of counter-knives 42 is positioned in the first aggressiveness position (FIG. 4) and positions the ramp 64 in the second ramp position when the bank of counter-knives 42 is positioned in the second aggressiveness position (FIG. 5).

The adjuster 74 comprises the knife actuator 52 and a ramp actuator 76. The ramp actuator 76 positions the ramp 64 in the first ramp position when the knife actuator 52 positions the bank of counter-knives 42 in the first aggressiveness position and positions the ramp in the second ramp position when the knife actuator 52 positions the bank of counter-knives 42 in the second aggressiveness position.

The ramp actuator 76 causes the ramp 64 to move between ramp positions in response to actuation of the bank of counter-knives by the knife actuator 52. The ramp actuator 76 positions the ramp 64 in the first ramp position in response to when the knife actuator 52 positions the bank of counter-knives 42 in the first aggressiveness position and positions the ramp in the second ramp position in response to when the knife actuator 52 positions the bank of counter-knives 42 in the second aggressiveness position.

The ramp actuator 76 causes the ramp 64 to pivot about the ramp pivot axis 68 between ramp positions. The ramp 64 is coupled to the fixed portion 66 for pivotable movement about the axis of rotation 57 between the first ramp position and the second ramp position in response to operation of the ramp actuator 76.

Illustratively, the ramp actuator 76 includes a linkage 78 at a first longitudinal end portion 80 of the ramp 64 and another linkage 78 at an opposite second longitudinal end portion 82 of the ramp 64. The ramp 64 is coupled to the fixed portion 66 for pivotable movement between the first ramp position and the second ramp position in response to operation of the linkages 78 due to rotation of the shaft 54.

Each linkage 78 is coupled to the shaft 54 and the ramp 64 to move the ramp 64 in response to rotation of the shaft 54 about the axis of rotation 57. The linkage 78 includes a first link 84 fixed to the shaft 54 to rotate therewith, a second link 86 fixed to the ramp 64, and a third link 88 interconnecting the first link 84 and the second link 86. The first link 84 is driven by rotation of the shaft 54 about the axis of rotation 57. The third link 88 transmits motion of the first link 84 to the second link 86, which, in turn, pivots the ramp 64 about the ramp pivot axis 68.

Figure 6:
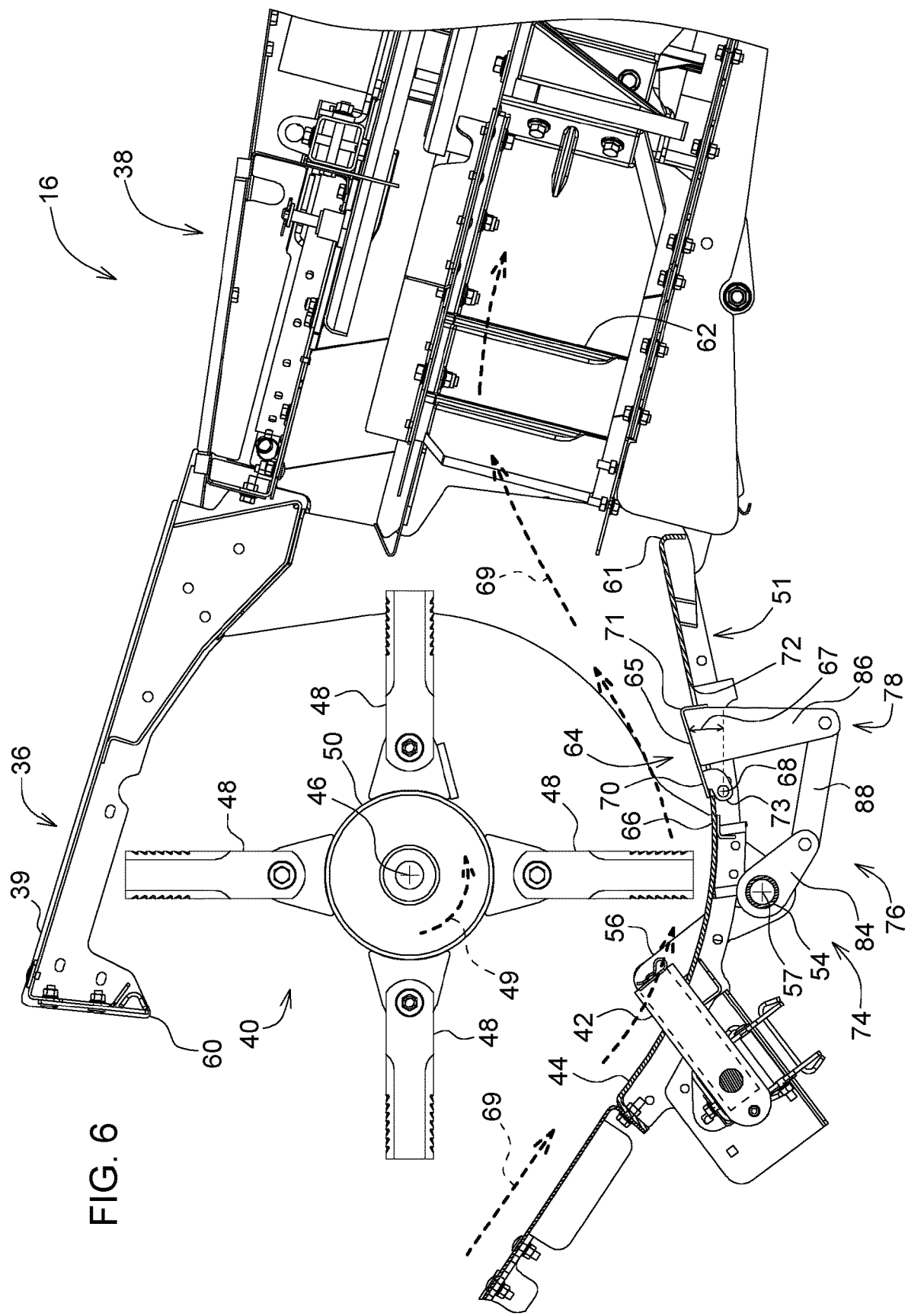
FIG. 6 is a side elevational view showing the bank of counter-knives in a third aggressiveness position and the ramp in a third ramp position.

Each of the bank of counter-knives 42 and the ramp 64 can have any suitable number of positions. The bank of counter-knives 42 can have any suitable number of aggressiveness positions, which may be discrete positions or a continuous range of positions. For example, the bank of counter-knives 42 can have three aggressiveness positions, such as, for example, the first aggressiveness position at 100% engagement (FIG. 4), the second aggressiveness position at 0% engagement (FIG. 5), and a third aggressiveness position at 50% engagement (FIG. 6). In another example, the bank of counter-knives 42 can have five aggressiveness positions, which includes, in addition to the three already mentioned, a fourth aggressiveness position at 25% engagement (not shown) and a fifth aggressiveness position at 75% engagement (not shown).

The ramp 64 can have any suitable number of ramp positions, which may be discrete positions or a continuous range of positions. In such a case, the ramp positions correspond to the aggressiveness positions of the bank of counter-knives 42. For example, the ramp 64 can have three ramp positions, such as, for example, the first ramp position being in the fully lowered position and corresponding to the first aggressiveness position (FIG. 4), the second ramp position being in the fully raised position and corresponding to the second aggressiveness position (FIG. 5), and a third ramp position being in an intermediate position between the first and second ramp positions and corresponding to the third aggressiveness position (FIG. 6). The angle of inclination 67 of the ramp 64 in the third ramp position is greater than the angle of inclination 67 in the first ramp position and lesser than the angle of inclination 67 in the second ramp position.

In another example, the ramp 64 can have a fourth ramp position (not shown) between the first ramp position and the third ramp position and corresponding to the fourth aggressiveness position, and a fifth ramp position (not shown) between the second ramp position and the third ramp position and corresponding to the fifth aggressiveness position. The angle of inclination 67 of the ramp 64 in the fourth ramp position is greater than the angle of inclination 67 in the first ramp position and lesser than the angle of inclination 67 in the third ramp position. The angle of inclination 67 of the ramp 64 in the fifth ramp position is greater than the angle of inclination 67 in the third ramp position and lesser than the angle of inclination 67 in the second ramp position.

The adjuster 74 positions the ramp 64 in the ramp position corresponding to the aggressiveness position of the bank of counter-knives 42. The ramp actuator 76 positions the ramp 64 in the first, second, third, fourth, and fifth ramp positions in response to when the knife actuator 52 positions the bank of counter-knives 42 in the first, second, third, fourth, and fifth aggressiveness position, respectively.

In other examples, an adjuster (not shown) includes the knife actuator 52, a bank sensor, a ramp actuator, and a controller (not shown). The bank sensor senses the aggressiveness position of the bank of counter-knives 42 and generates a position signal indicative of the aggressiveness position. The controller receives the position signal, determines a desired ramp position at which to set the ramp 64, and outputs a control signal to the ramp actuator (e.g., electrical motor and corresponding mechanical structure) to command the ramp actuator to move the ramp 64 to the desired ramp position, for example, the first ramp position when the bank of counter-knives 42 is positioned in the first aggressiveness position, the second ramp position when the bank of counter-knives 42 is positioned in the second aggressiveness position, and so on.

While the above describes example embodiments of the present disclosure, these descriptions should not be viewed in a limiting sense. Rather, other variations and modifications can be made without departing from the scope and spirit of the present disclosure as defined in the appended claims.

What is claimed is:

1. A chopper for an agricultural harvester, comprising:
a housing, the housing comprising a variable geometry outlet floor, a rotor positioned in an interior region of the housing for rotation therein relative to the housing,
a bank of counter-knives, the rotor comprising blades that interact with the bank of counter-knives to chop crop residue upon rotation of the rotor in a chopping direction, the bank of counter-knives movable relative to the rotor between a first aggressiveness position and a second aggressiveness position to adjust a chopping aggressiveness of the chopper with the chopping aggressiveness being greater when the bank of counter-knives is positioned in the first aggressiveness position than in the second aggressiveness position, the outlet floor comprising a ramp positioned downstream from the bank of counter-knives relative to the chopping direction and movable relative to the rotor between a first ramp position and a second ramp position to manage a trajectory of crop residue relative to a residue spreader of the agricultural harvester, the ramp raised more into the interior region in the second ramp position than in the first ramp position, and
an adjuster in communication with the bank of counter-knives and the ramp to position the ramp in the first ramp position when the bank of counter-knives is positioned in the first aggressiveness position and to position the ramp in the second ramp position when the bank of counter-knives is positioned in the second aggressiveness position.

2. The chopper of claim 1, wherein the ramp has a greater angle of inclination in the second ramp position than in the first ramp position.

3. The chopper of claim 1, wherein the adjuster comprises a knife actuator to move the bank of counter-knives between the first and second aggressiveness positions and a ramp actuator to position the ramp in the first ramp position when the knife actuator positions the bank of counter-knives in the first aggressiveness position and to position the ramp in the second ramp position when the knife actuator positions the bank of counter-knives in the second aggressiveness position.

4. The chopper of claim 3, wherein the knife actuator comprises a rotatable shaft, and the ramp actuator comprises a linkage coupled to the rotatable shaft and the ramp to move the ramp in response to rotation of the rotatable shaft.

5. A residue management system comprising the chopper of claim 1 and a residue spreader, the ramp movable relative to the housing between the first ramp position and the second ramp position to manage the trajectory of crop residue relative to the residue spreader.

6. An agricultural harvester comprising the chopper of claim 1.

7. A chopper for an agricultural harvester, comprising:
a housing, the housing comprising a variable geometry outlet floor, a rotor positioned in an interior region of the housing for rotation therein relative to the housing,
a bank of counter-knives, the rotor comprising blades that interact with the bank of counter-knives to chop crop residue upon rotation of the rotor in a chopping direction, the bank of counter-knives movable relative to the rotor between a first aggressiveness position and a second aggressiveness position to adjust a chopping aggressiveness of the chopper with the chopping aggressiveness being greater when the bank of counter-knives is positioned in the first aggressiveness position than in the second aggressiveness position, the outlet floor comprising a ramp positioned downstream from the bank of counter-knives relative to the chopping direction and movable relative to the rotor between a first ramp position and a second ramp position to manage a trajectory of crop residue relative to a residue spreader of the agricultural harvester, the ramp raised more into the interior region in the second ramp position than in the first ramp position, and
an adjuster in communication with the bank of counter-knives and the ramp to position the ramp in the first ramp position when the bank of counter-knives is positioned in the first aggressiveness position and to position the ramp in the second ramp position when the bank of counter-knives is positioned in the second aggressiveness position,
wherein the adjuster comprises a knife actuator to move the bank of counter-knives between the first and second aggressiveness positions and a ramp actuator to position the ramp in the first ramp position when the knife actuator positions the bank of counter-knives in the first aggressiveness position and to position the ramp in the second ramp position when the knife actuator positions the bank of counter-knives in the second aggressiveness position, the knife actuator comprises a rotatable shaft, the ramp actuator comprises a linkage coupled to the rotatable shaft and the ramp to move the ramp in response to rotation of the rotatable shaft, the outlet floor comprises a fixed portion, and the ramp is coupled to the fixed portion for pivotable movement between the first ramp position and the second ramp position in response to operation of the linkage due to rotation of the shaft.

8. A chopper for an agricultural harvester, comprising:
a housing, the housing comprising a variable geometry outlet floor, a rotor positioned in an interior region of the housing for rotation therein relative to the housing,
a bank of counter-knives, the rotor comprising blades that interact with the bank of counter-knives to chop crop residue upon rotation of the rotor in a chopping direction, the bank of counter-knives movable relative to the rotor between a first aggressiveness position and a second aggressiveness position to adjust a chopping aggressiveness of the chopper with the chopping aggressiveness being greater when the bank of counter-knives is positioned in the first aggressiveness position than in the second aggressiveness position, the outlet floor comprising a ramp positioned downstream from the bank of counter-knives relative to the chopping direction and movable relative to the rotor between a first ramp position and a second ramp position to manage a trajectory of crop residue relative to a residue spreader of the agricultural harvester, the ramp raised more into the interior region in the second ramp position than in the first ramp position, and
an adjuster in communication with the bank of counter-knives and the ramp to position the ramp in the first ramp position when the bank of counter-knives is positioned in the first aggressiveness position and to position the ramp in the second ramp position when the bank of counter-knives is positioned in the second aggressiveness position, wherein the adjuster comprises a knife actuator to move the bank of counter-knives between the first and second aggressiveness positions and a ramp actuator to position the ramp in the first ramp position when the knife actuator positions the bank of counter-knives in the first aggressiveness position and to position the ramp in the second ramp position when the knife actuator positions the bank of counter-knives in the second aggressiveness position, the outlet floor comprises a fixed portion, and the ramp is coupled to the fixed portion for pivotable movement between the first ramp position and the second ramp position in response to operation of the ramp actuator.

9. A chopper for an agricultural harvester, comprising:
a housing, the housing comprising a variable geometry outlet floor, a rotor positioned in an interior region of the housing for rotation therein relative to the housing,
a bank of counter-knives, the rotor comprising blades that interact with the bank of counter-knives to chop crop residue upon rotation of the rotor in a chopping direction, the bank of counter-knives movable relative to the rotor between a first aggressiveness position and a second aggressiveness position to adjust a chopping aggressiveness of the chopper with the chopping aggressiveness being greater when the bank of counter-knives is positioned in the first aggressiveness position than in the second aggressiveness position, the outlet floor comprising a ramp positioned downstream from the bank of counter-knives relative to the chopping direction and movable relative to the rotor between a first ramp position and a second ramp position to manage a trajectory of crop residue relative to a residue spreader of the agricultural harvester, the ramp raised more into the interior region in the second ramp position than in the first ramp position, and
an adjuster in communication with the bank of counter-knives and the ramp to position the ramp in the first ramp position when the bank of counter-knives is positioned in the first aggressiveness position and to position the ramp in the second ramp position when the bank of counter-knives is positioned in the second aggressiveness position, wherein the outlet floor comprises a fixed portion, and the ramp is coupled to the fixed portion for pivotable movement between the first ramp position and the second ramp position.

10. The chopper of claim 9, wherein the ramp comprises a first end portion coupled pivotally to the fixed portion of the outlet floor and a second end portion movable between the first ramp position and the second ramp position, and the first end portion is positioned between the bank of counter-knives and the second end portion.

11. The chopper of claim 9, wherein the fixed portion of the outlet floor comprises an opening, and the ramp is positioned in the opening.

12. The chopper of claim 9, wherein the adjuster comprises a rotatable shaft and a linkage coupled to the rotatable shaft and the ramp to move the ramp in response to rotation of the rotatable shaft.

13. The chopper of claim 12, wherein the ramp is coupled to the fixed portion for pivotable movement between the first ramp position and the second ramp position in response to operation of the linkage due to rotation of the shaft.

14. A chopper for an agricultural harvester, comprising:
a housing, the housing comprising a variable geometry outlet floor, a rotor positioned in an interior region of the housing for rotation therein relative to the housing,
a bank of counter-knives, the rotor comprising blades that interact with the bank of counter-knives to chop crop residue upon rotation of the rotor in a chopping direction, the bank of counter-knives movable relative to the rotor between a first aggressiveness position and a second aggressiveness position to adjust a chopping aggressiveness of the chopper with the chopping aggressiveness being greater when the bank of counter-knives is positioned in the first aggressiveness position than in the second aggressiveness position, the outlet floor comprising a ramp positioned downstream from the bank of counter-knives relative to the chopping direction and movable relative to the rotor between a first ramp position and a second ramp position to manage a trajectory of crop residue relative to a residue spreader of the agricultural harvester, the ramp raised more into the interior region in the second ramp position than in the first ramp position, and
an adjuster in communication with the bank of counter-knives and the ramp to position the ramp in the first ramp position when the bank of counter-knives is positioned in the first aggressiveness position and to position the ramp in the second ramp position when the bank of counter-knives is positioned in the second aggressiveness position, wherein the outlet floor comprises an opening, and the ramp is positioned in the opening.

* * * * *